United States Patent [19]
Lawson

[11] Patent Number: 5,727,742
[45] Date of Patent: Mar. 17, 1998

[54] FOOD MIXER INCORPORATING AN ARCHIMEDEAN SCREW AND CUTTING BLADES

[76] Inventor: Anthony Charles Lawson, 11B Marlborough House, 154 Tai Hang Road, Hong Kong, Hong Kong

[21] Appl. No.: 789,935

[22] Filed: Jan. 28, 1997

Related U.S. Application Data

[63] Continuation of Ser. No. 507,337, filed as PCT/AU94/00073 Feb. 18, 1994, abandoned.

[30] Foreign Application Priority Data

Feb. 18, 1993 [AU] Australia .................. PL7336

[51] Int. Cl.[6] ............................................. A47J 43/046
[52] U.S. Cl. ...................... 241/199.12; 241/260.1; 366/266; 366/314; 366/319
[58] Field of Search ........................... 366/264, 266, 366/205, 314, 319, 603; 99/348, 510; 241/199.12, 260.1

[56] References Cited

U.S. PATENT DOCUMENTS

| | | | |
|---|---|---|---|
| 664,130 | 12/1900 | Culmann et al. | 366/266 X |
| 784,598 | 3/1905 | Stevens | 366/266 X |
| 1,408,609 | 3/1922 | Lackey | 366/266 X |
| 1,541,371 | 6/1925 | Merrill | 366/80 X |
| 2,282,623 | 5/1942 | Torrence | 366/266 X |
| 2,838,794 | 6/1958 | Munger et al. | 241/260.1 X |
| 3,329,409 | 7/1967 | Raleigh | 366/266 X |
| 4,101,166 | 7/1978 | Haag et al. | 366/266 X |
| 4,344,580 | 8/1982 | Horshall et al. | 241/260.1 X |
| 4,350,444 | 9/1982 | Yargus et al. | 366/266 X |
| 5,148,999 | 9/1992 | Curfman et al. | 241/260.1 |
| 5,233,916 | 8/1993 | Butler et al. | |

FOREIGN PATENT DOCUMENTS

| | | | |
|---|---|---|---|
| 0193865 | 9/1986 | European Pat. Off. | |
| 1086487 | 2/1955 | France. | |
| 2312295 | 12/1976 | France. | |
| 2637484 | 4/1990 | France. | |
| 528679 | 6/1955 | Italy | 241/199.12 |
| 3193013 | 8/1991 | Japan. | |
| 3237945 | 10/1991 | Japan. | |
| 1431837 | 10/1988 | U.S.S.R. | 241/260.1 |
| 1806814 | 4/1993 | U.S.S.R. | 366/266 |
| 1468493 | 3/1977 | United Kingdom. | |

*Primary Examiner*—Charles E. Cooley
*Attorney, Agent, or Firm*—Edwin D. Schindler

[57] ABSTRACT

A mixer having a container (14), an opened topped hollow sleeve (20) adjacent the lower surface of the container, at least one opening (22) into the sleeve adjacent the lower edge thereof, a screw impeller (25) located in the sleeve and a driving device for the impeller (11) so that material to be mixed can enter the sleeve through the opening adjacent the lower end thereof, be mixed by the impeller and delivered through the open top of the sleeve. An impeller (60) can be formed with cutting blades to act to cut material passing through the sleeve as well as to mix this material.

9 Claims, 2 Drawing Sheets

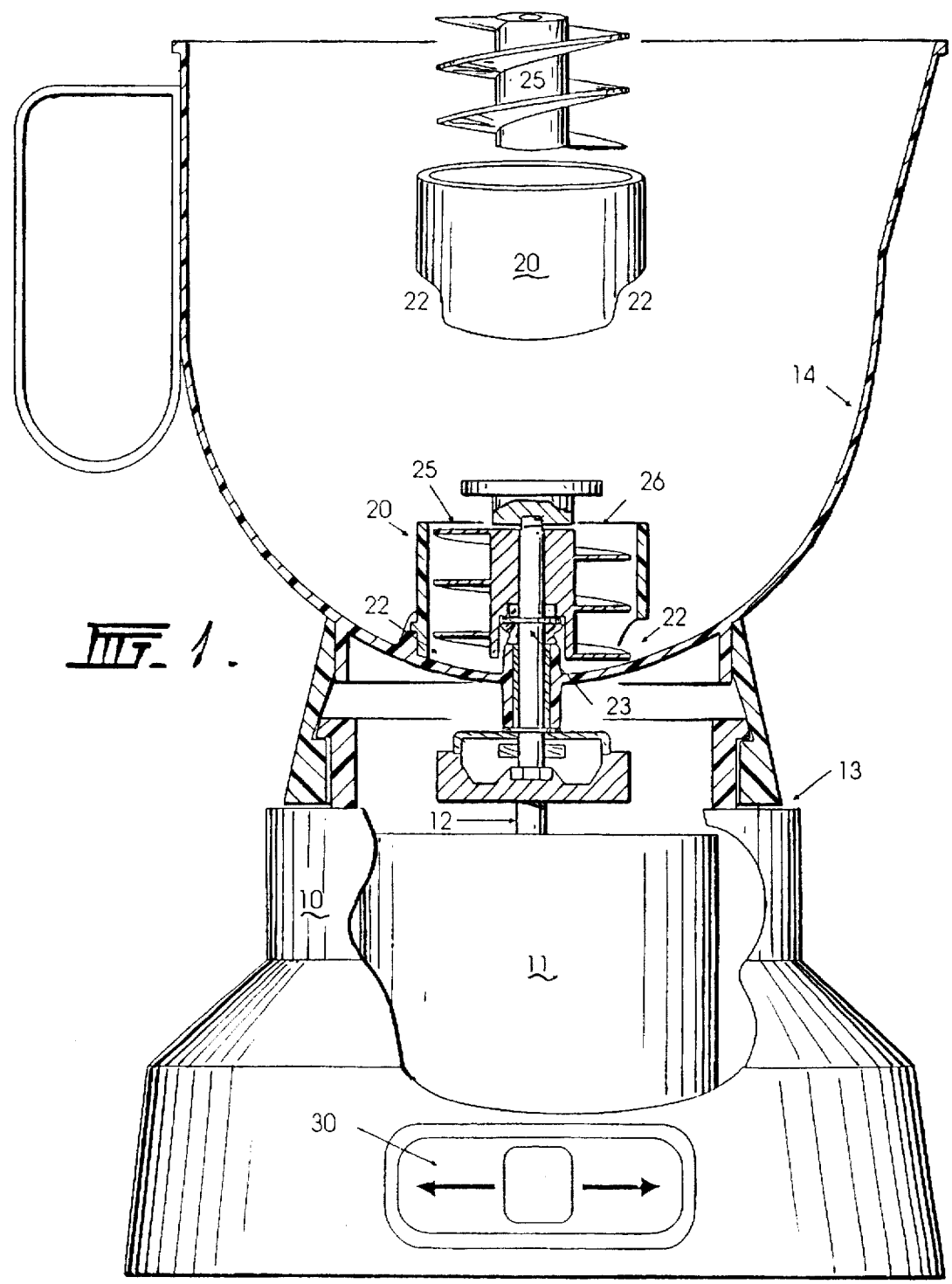

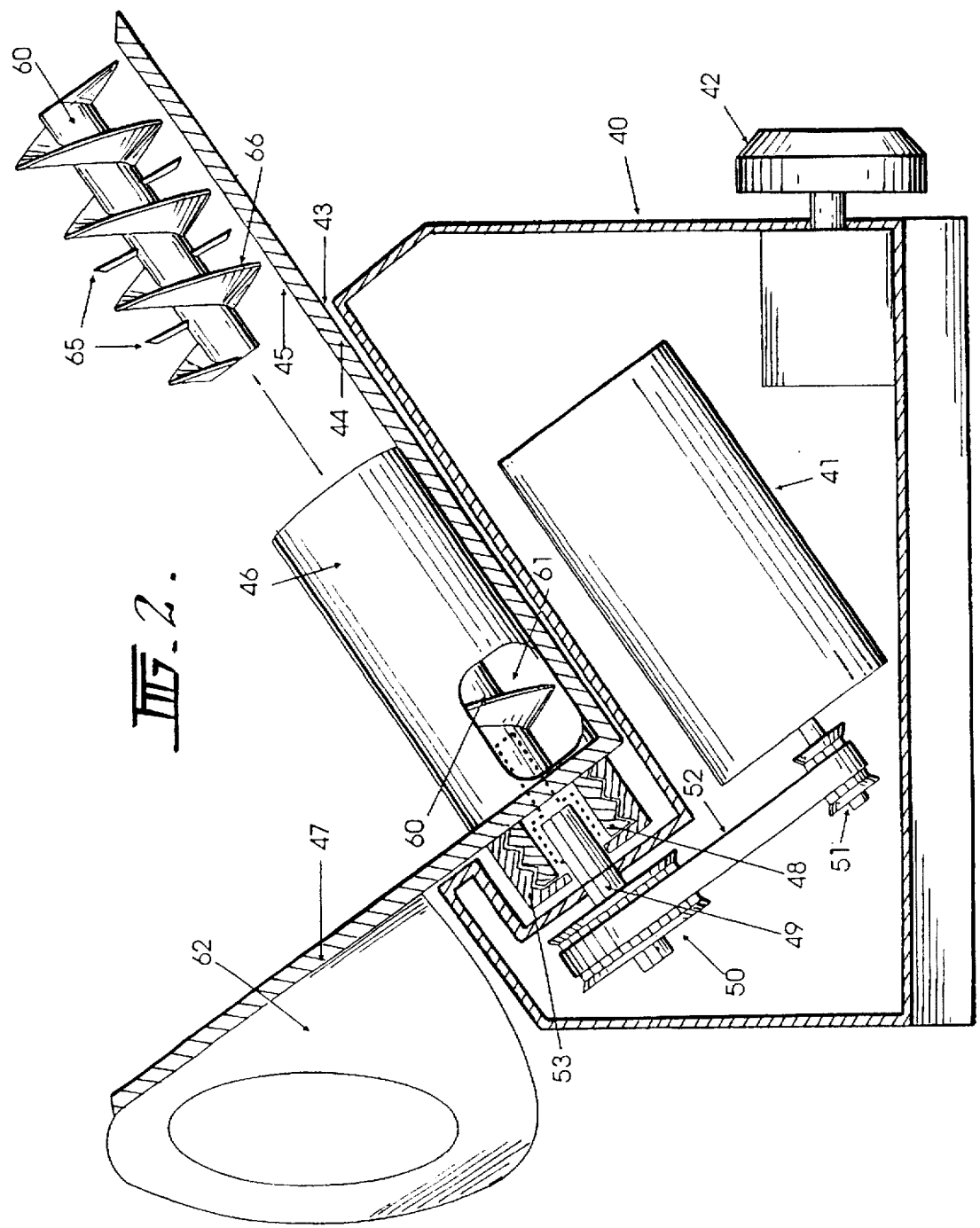

FOOD MIXER INCORPORATING AN ARCHIMEDEAN SCREW AND CUTTING BLADES

This is a continuation of application Ser. No. 08/507,337, filed as PCT/AU94/00073, Feb. 18, 1994, now abandoned.

BACKGROUND OF THE INVENTION

This invention relates to a food mixer and particularly to a power operated food mixer.

Most food mixers have either had pairs of beaters which rotate about parallel axis so that the beater heads inter-engage and the material being mixed tends to pass between the heads.

In some other applications, where heavier materials are being beaten or kneaded, a single blade is used and this blade may either be shaped, as in a dough hook or have a surface which is open and through and around which the material being mixed passes.

SUMMARY OF THE INVENTION

The object of the invention is to provide a mixer which provides effective mixing of components but which does not have blades as have previously been used.

The invention in its broadest sense comprises a mixer having a container, an opened topped hollow sleeve adjacent the lower surface of the container, an opening into the sleeve adjacent the lower edge thereof, a screw impeller located in the sleeve and driving means for the impeller whereby material to be mixed can enter the sleeve through the opening adjacent the lower end thereof, be mixed by the impeller, delivered through the open top of the sleeve and permitted to pass into the container to again enter the sleeve.

It is preferred that the container is, internally, substantially part spherical with the sleeve being substantially radial to the container.

Alternatively, the container may have a lower surface which is at an angle to the horizontal and the axis of the sleeve can be parallel to the surface.

It is preferred that the drive shaft is axial of the cylinder and the impeller may be formed at its inner end to cooperate with the drive shaft whereby it can be rotated.

In an alternative form of the invention, the mixer may also act to chop the product being passed therethrough and, in one arrangement, the periphery of the impeller could be formed so that components can pass therebeneath and be cut or, alternatively, chopping blades could be incorporated in the impeller, preferably between turns of the flights thereof.

BRIEF DESCRIPTION OF THE DRAWING FIGURES

In order that the invention may be more readily understood, I shall describe two particular embodiments of mixer made in accordance with the invention with reference to the accompanying drawings, in which:

FIG. 1 is a side view, partially sectionalized, of the mixer of the invention; and FIG. 2 is a side view, partly sectionalized, of a second form of the mixer of the invention.

DETAILED DESCRIPTION OF THE DRAWING AND PREFERRED EMBODIMENTS

The mixer may have a body 10 within which there is located a motor 11 and drive shaft, the locations of which will be described further hereinafter.

The body may have a formed upper surface 13 to receive a container or mixing bowl 14 which may have any required shape and, as illustrated, is substantially cylindrical.

Located within the container 14 and at the lowest portion thereof, when it is located in the base 10, there is a hollow cylindrical sleeve 20, the inner end of which is connected to the wall of the container.

The sleeve has a pair of opposed openings 22 adjacent the lower portion thereof which openings may be of any required size and, if required, may be closed by a mesh which is of large enough spacings to permit the material to be mixed to pass therethrough relatively easily but small enough to prevent a finger or other relatively solid articles to pass therethrough.

The sleeve may be a fixture in the container or it could be removably connected therein. If it is removable, it may be preferred that there is an interlock to prevent operation of the impeller without a sleeve being in position.

Mounted in the body and axially of the sleeve 20, there is a drive assembly 23 and there is preferably a gland or seal (not illustrated) in the body through which this assembly can pass for connection with the motor drive shaft 12.

The motor may have a speed control 30 accessible to the exterior of the body so that a required speed of rotation can be selected by the operator. This speed control can also be used to reverse the direction of rotation of the motor 11 should this be required.

Removably located in the sleeve 20 is an helical impeller 25 which may be in the form of an Archimedean screw with a continuous flight and which is adapted to pass into the sleeve and to be received in the drive assembly 23 therein. Whilst it is preferred that the impeller is in the form of an Archimedean screw, and I believe that this is the most efficient form, other impeller forms could be used.

Thus, when the impeller is passed into the sleeve, it will engage with the drive shaft 12 so that, on operation of the motor 11 the impeller will be rotated. It may be preferred that the impeller locks to or is otherwise retained on the drive shaft.

In use, the container 14 is located in position on the base 10 and the impeller 25 is passed into the sleeve 20 and engaged with the drive assembly 23.

The materials to be mixed are then added to the container and the motor started.

Some of the material will pass into the sleeve 20 through the apertures 22 therein and this will be carried upwardly by the impeller and the work being done will both mix the material and act to hold the impeller in engagement with the drive assembly 23. The material will be delivered from the open end 26 of the sleeve 20 from whence it will fall back into the container.

This process is, of course, continuous and the material in the container will, in a relatively short time, become homogeneous although, if there are small solid articles such as dried fruit or the like, these will not be damaged by the mixing process.

If there is any blockage of the movement, the motor could be reversed to tend to move the material in the opposite direction.

When mixing is completed, the motor 11 is stopped and the container 14 and the impeller 25 and/or the sleeve 20 can be removed from the base 10 and the contents of the container can be removed, the impeller can be removed from the sleeve and the material located thereabouts can be separated therefrom.

The impeller 25 and the container 14 can be made of material which can readily be washed, and preferably washed in a dish washer so that they can be cleaned, but it will be appreciated that cleaning is not difficult as the container itself has no difficult corners, the sleeve 20 can readily be accessed for cleaning and the impeller 25 can simply be cleaned by cleaning about the flight.

Referring now to FIG. 2, there is a base 40 which includes a motor 41 and a speed control 42 accessible to a user.

The base 40 is formed with a face 43 which is adapted to receive a container 44 which has a surface 45 which is located, when on the base 40, at an angle to the horizontal and which is so formed that this surface 45 provides the lowest part of container 44. The outer end of the container being generally outwardly directed.

Located in the container there is a sleeve 46 which is connected to the face 43 and an end wall 47 of the container. Mounted within the end wall 47 there is a drive assembly 48 which, at its outer end is connected to the shaft 49 of a pulley 50.

In this embodiment, the motor 41 has a pulley 51 and has a belt 52 connecting it with pulley 50.

The diameters of the pulleys are selected to give the required speed of rotation but preferably the motor pulley 51 can be substantially smaller in diameter than the drive shaft pulley 50 to permit good torque transfer.

There is a liquid retaining gland 53 about the moving parts of the drive assembly to prevent loss of liquid from within the container.

The impeller 60, which is an Archimedean screw is adapted to pass within the sleeve 46 and to engage with the drive assembly 48 whereby it can be driven.

There are also, as illustrated a pair of apertures 61 into the sleeve whereby the product can enter the sleeve and be acted on by the impeller 60.

The container may have a handle or the like 62 connected thereto to permit readily handling of the product of the mixing.

In operation, this embodiment is effectively identical to that of FIG. 1 in that the material to be mixed is recirculated through the sleeve, drops to the junction of the side wall 44 and the end wall 47 where it can again be passed through the sleeve.

By using a modified impeller, it is possible to provide a chopping action as well as a mixing process.

In these modified forms, the cylindrical sleeve may be of metal or may have a metal insert to give a chopping surface. The alternative sleeve can be similar in form to the removable sleeve and can be relaced therefor if this is an alternative fitting.

In one form of the device, I provide the impeller flight with serrated or cut out portions at their periphery so that solid material can tend to pass beneath the flight but will then be cut by the adjacent portion.

In this form, the normal portions of the flights, that is the portions which are radial and arcuate and corresponding to the shape to the cylindrical insert can be sharpened so that solid material can be readily cut between the portion of the flight and the cylindrical sleeve.

In a second form of this aspect, as illustrated in the exploded impeller of FIG. 2. I may provide elongated knives or blades 65 extending radially outwardly between adjacent turns of the flight 66 of the impeller and these can effect a cutting action as the impeller is rotated.

If required, the knives or blades could be mounted on the impeller and capable of moving relative thereto and drive means may be provided to enable the knives or blades to rotate at a speed different to the impeller.

I can also provide, on the impeller and substantially parallel to the axis cutting blades which extend toward the next portion of the flight.

I could also provide projection or aperture on or in the impeller or the blade to assist in aeration of the products being mixed.

It will be seen in each such embodiment, the process is continuous, as described earlier in relation to mixing and the operator, as there is no obstruction to the open end of the container, can readily examine the mixture and to continue the cutting and mixing action for as long as is required.

It will be appreciated that the shape of the container can have a substantial effect on the operation and it is formed so as to permit the material that leaves the sleeve to fall back to the lowest position in the container, adjacent the aperture into the sleeve, for recycling and this also enables relatively small quantities of material to be effectively mixed.

Of course, notwithstanding the formation of the container and the sleeve there can be some material which is left, say on the wall of the container. It will be appreciated that this can readily be moved by a spatular or the like and the and the likelihood of damage to the implement is small as it would have to enter the sleeve before striking the impeller.

It will also be appreciated that there is no obstruction to the entrance to the container when mixing is occurring so that the person using the mixer can closely supervise the characteristics of the components being mixed, can add addition materials thereto without any difficulty and, as mentioned above, can also use an implement, particularly if the contents are relatively viscous, to feed the material into the aperture in the sleeve without there being any great likelihood of damage to the implement or the mixer as has generally previously been the case, particularly where parallel beaters are used.

This means that for the operator, a very satisfactory arrangement is available.

Whilst I have described herein a particular forms of drive and motor assembly it will be appreciated that this can be varied substantially depending upon the designed requirements, for example the motor could drive a gear box which, in turn, has the drive shaft extending therefrom. In such a case the motor may be parallel to or at right angles to the drive shaft.

Also the shape of container could vary and possibly different sized containers could have different shapes to optimize mixing for various quantities of materials.

I claim:

1. A food mixer, comprising:

a base and a container, said container having an open upper surface through which food material can be placed into or removed from said container, said container being provided with a screw impeller having a continuous flight, said screw impeller being located within an open topped sleeve adjacent a lower surface of said container and further including enlongated cutting blades extending radially from said screw impeller between adjacent turns of said flight, the open topped sleeve having at least one opening in a lower end thereof so that food material can enter the open topped sleeve through the opening, said container being removably connected to said base, with said base including a motor capable of rotating said screw impeller via driving means passing through said container in a sealed relationship therewith, so that when said screw impeller is in motion, food material enters a lower portion of the open topped sleeve and exits its upper surface after mixing and circulates between sides of said container and outside of said sleeve, said open topped sleeve sufficiently encasing said screw impeller for permitting a safe insertion of a food implement into said container while said screw impeller is in motion.

2. A mixer as claimed in claim 1 wherein the driving means is axial with the motor.

3. A mixer as claimed in claim 1 wherein the driving means is indirectly driven by the motor.

4. A mixer as claimed in claim 1 wherein the sleeve extends upwardly from the lower surface of the container with an axis of the sleeve substantially normal to the lower surface of the container.

5. A mixer as claimed in claim 4 wherein the container is, internally, substantially part spherical with the sleeve being substantially radial to the container.

6. A mixer as claimed in claim 4 wherein the opening into the sleeve is adjacent a junction between the sleeve and the lower surface of the container.

7. A mixer as claimed in claim 6 wherein there is more than one opening in the sleeve.

8. A mixer as claimed in claim 1 wherein the sleeve is removable.

9. A mixer as claimed in claim 1 wherein the impeller is an Archimedean screw.

* * * * *